United States Patent
Mufford et al.

(10) Patent No.: US 6,186,254 B1
(45) Date of Patent: Feb. 13, 2001

(54) TEMPERATURE REGULATING SYSTEM FOR A FUEL CELL POWERED VEHICLE

(75) Inventors: W. Edward Mufford, Langley; Douglas G. Strasky, Parksville; Brian N. Gorbell, Summerland, all of (CA)

(73) Assignee: Xcelliss Fuel Cell Engines Inc., Nabern (DE)

( * ) Notice: Under 35 U.S.C. 154(b), the term of this patent shall be extended for 0 days.

(21) Appl. No.: 08/973,278

(22) PCT Filed: May 29, 1996

(86) PCT No.: PCT/CA96/00351

§ 371 Date: Feb. 12, 1998

§ 102(e) Date: Feb. 12, 1998

(87) PCT Pub. No.: WO96/41393

PCT Pub. Date: Dec. 19, 1996

(51) Int. Cl.[7] .............................. B60K 1/00; H01M 8/04
(52) U.S. Cl. .......................... 180/65.3; 180/165; 429/26
(58) Field of Search ..................... 180/65.1, 65.2, 180/65.3, 65.8, 165; 429/24, 26, 22, 19, 17, 49

(56) References Cited

U.S. PATENT DOCUMENTS

| | | | |
|---|---|---|---|
| 3,507,702 | 4/1970 | Sanderson | 429/24 |
| 3,801,372 | * 4/1974 | Shaw | 429/13 |
| 4,376,097 | 3/1983 | Emelock | 422/189 |
| 4,640,873 | * 2/1987 | Tajima et al. | 429/24 |
| 4,824,740 | 4/1989 | Abrams et al. | 429/24 |
| 5,009,967 | * 4/1991 | Scheffler | 429/23 |
| 5,047,298 | 9/1991 | Perry, Jr. et al. | 429/17 |
| 5,166,584 | 11/1992 | Fukino et al. | 318/139 |
| 5,187,024 | * 2/1993 | Matsumura | 429/24 |
| 5,193,635 | 3/1993 | Mizuno et al. | 180/65.3 |
| 5,200,278 | 4/1993 | Watkins et al. | 429/24 |
| 5,228,529 | 7/1993 | Rosner | 180/65.3 |
| 5,316,870 | 5/1994 | Ohga | 429/24 |
| 5,322,744 | 6/1994 | Koseki | 429/13 |
| 5,346,778 | 9/1994 | Ewan et al. | 429/19 |
| 5,360,679 | 11/1994 | Buswell et al. | 429/19 |
| 5,366,821 | 11/1994 | Merritt et al. | 429/21 |
| 5,409,784 | 4/1995 | Bromberg et al. | 429/13 |
| 5,490,572 | * 2/1996 | Tajirir et al. | 180/65.1 |
| 5,500,292 | 3/1996 | Muranaka et al. | 429/209 |
| 5,503,944 | * 4/1996 | Meyer et al. | 429/13 |
| 5,531,285 | * 7/1996 | Green | 180/65.2 |
| 5,537,956 | 7/1996 | Rennfeld et al. | 123/41.29 |
| 5,605,770 | 2/1997 | Andreoli et al. | 429/20 |
| 5,624,003 | * 4/1997 | Matsuki et al. | 180/65.1 |
| 5,678,760 | * 10/1997 | Muso et al. | 237/2 A |

FOREIGN PATENT DOCUMENTS

WO 94/10716  5/1994 (WO).

OTHER PUBLICATIONS

Kazuo, et al., Fuel Cell, Publication No. JP4043568, Publication Date Feb. 13, 1992 (Abstract Only).

Ogden Process Electric Heat and Control Products, Ogden Manufacturing Company.

Shiyuuichi, "Fuel Cell Power Generation Plant," Publication No. JP60041767, Publication Date Mar. 5, 1985 (Abstract Only).

Tetsuo, "Electric Heat Supply System of Liquid Cooling Type Fuel Cell," Publication No. JP62198058 (Abstract Only).

Yozo, et al., "Fuel Battery Power Generating System," Publication No. JP61085775, Publication Date May 1, 1986 (Abstract Only).

* cited by examiner

*Primary Examiner*—J. J. Swann
*Assistant Examiner*—David R. Dunn
(74) *Attorney, Agent, or Firm*—McAndrews, Held & Malloy, Ltd.

(57) ABSTRACT

A temperature regulating system for a fuel cell powered electric motor vehicle assists in maintaining the temperature of the fuel cell stack within a temperature range that provides satisfactory fuel cell performance.

34 Claims, 4 Drawing Sheets

TEMPERATURE REGULATING SYSTEM FOR A FUEL CELL POWERED VEHICLE

FIELD OF THE INVENTION

The present invention relates to a temperature regulating system for a motor vehicle. More particularly, the present invention relates to a temperature regulating system for a motor vehicle that receives power from a fuel cell system.

BACKGROUND OF THE INVENTION

Internal combustion engines have contributed greatly to the advancement of society. Vehicles powered by these engines have shortened the travel times between us by making long distance road travel routine. Such engines, however, have also greatly contributed to the pollution of our environment. The combustion of petroleum products in these engines results in unwanted byproducts such as carbon monoxide, carbon dioxide, sulfur dioxide, nitrogen oxides, etc., that are exhausted into the atmosphere.

Vehicles powered by alternative energy sources are under development. One such alternative energy source is the fuel cell. Fuel cells generate electric power through, for example, reaction of hydrogen and oxygen. The electric power that is generated is used to drive an electric motor that, in turn, drives the wheels of the vehicle. The product of the chemical reaction in a fuel cell utilizing hydrogen and oxygen is water, a product which is essential to our environment and which is easily disposed of.

Regulation of the temperature of the fuel cell is an important consideration for fuel cell powered vehicles. For example, fuel cell performance (and sometimes, lifetime) depends on the temperature at which the fuel cell is operating. Without proper temperature regulation, the fuel cell stack may not be able to supply adequate power to the electric motor of the vehicle and, as such, may not deliver the performance levels that are demanded by the consuming public.

Merritt et al. U.S. Pat. No. 5,366,821 discloses a fuel cell system which includes a coolant circuit having an electrical coil heater to raise the fuel cell stack to operating temperature and maintain that temperature (see column 2, lines 25–30 and column 8, line 50–column 9, line 23).

Mizuno et al. U.S. Pat. No. 5,193,635 discloses several embodiments of a fuel cell powered wheeled vehicle.

Sanderson U.S. Pat. No. 3,507,702 discloses a compact fuel cell system which includes a coolant circuit having an electrical heater to raise the fuel cell stack to operating temperature and maintain that temperature (see column 6, lines 28–66).

Patent Abstracts Of Japan, vol. 16, no. 230 (JA 04-043568) discloses a fuel cell that allows stable control of the cooling water temperature, and promotes water heat recovery without substantial loss, by performing the proportional control of a flow control electric valve, or controlling the speed of a pump and a blower in a fuel cell cooling system.

PCT/International Publication No. WO 94/10716 (Application No. PCT/US93/10333) discloses solid polymer fuel cell systems with a conventional coolant subsystem extending through the fuel cell stack.

SUMMARY OF THE INVENTION

A temperature regulating system for a fuel cell powered motor vehicle is disclosed that assists in maintaining the temperature of the fuel cell within a temperature range which provides satisfactory fuel cell performance. In accordance with a first embodiment of the system, the system includes an electric motor for propelling the vehicle and at least one fuel cell stack for generating electrical power to the electric motor. Each fuel cell stack is provided with temperature regulation means, including at least one heat transfer fluid inlet port and at least one heat transfer fluid outlet port to allow flow of a heat transfer fluid, hereinafter referred to as a "cooling medium" or "coolant", through the fuel cell stack. The cooling medium may be used to raise or lower the temperature of the fuel cells in the stack. The system is further provided with one or more pipes or conduits external to the fuel cell stack. The pipes or conduits define a coolant path for carrying the cooling medium, for example, water, glycol, or any other heat transfer medium, from the coolant outlet port to the coolant inlet port of the fuel cell stack. A resistor, connected to at least one source of electrical power, is disposed in the coolant path in thermal communication with the cooling medium. The resistor can be used to raise the temperature of the cooling medium, when it is desirable to raise the temperature of the fuel cells in the stack. The resistor is optionally disposed in a housing. The resistor may be electrically connected to the electric motor, via a suitable power conditioning system, so as to dissipate regenerative energy upon braking of the vehicle. The foregoing temperature regulating system topology has several advantageous aspects. First, the thermal energy generated by the regenerative braking is dissipated by the cooling medium within the temperature regulating system. Second, regenerative braking energy is converted into heat that is communicated to the cooling medium. Heating of the cooling medium may be desirable to maintain the fuel cell stack within a proper operating temperature range when the motor vehicle is operated in cool ambient temperatures or at start-up.

Alternatively, or in addition, the resistor may be electrically connected to receive electricity from shore power, thereby acting as a block heater that prevents the fuel cell system from freezing and facilitates start-up in cool ambient temperatures.

Alternatively, or in addition to one or both of the aforementioned sources of electrical power, fuel cell power may be used to supply electricity to the resistor. Fuel cell power may be advantageously used to power the resistor soon after start-up to bring the fuel cell stack within the preferred operating temperature range and during operation to improve fuel cell performance by maintaining the fuel cell stack within the preferred temperature range especially when the motor vehicle is operated in cool ambient temperatures. Fuel cell power may also be advantageously dissipated through the resistor at shut down, the resistor thereby acting as a bleed resistor consuming reactants remaining in the fuel cell stack and causing the stack voltage to fall so that the fuel cell stack is left in an electrically safe state. Other advantages also flow from the foregoing topology.

In accordance with a second embodiment of the system, the system includes an electric motor for propelling the vehicle and at least one fuel cell stack for generating electrical power to the electric motor. The fuel cell stack is provided with at least one coolant inlet port and coolant outlet port. One or more pipes or conduits external to the fuel cell stack are provided and define a coolant path for carrying a cooling medium from the coolant outlet port to the coolant inlet port of the fuel cell stack. The cooling medium is pumped through the coolant path by a main cooling pump that is disposed in the coolant path. Heat dissipation from the cooling medium is facilitated by a radiator disposed in the coolant path and optionally an air flow device that provides a cooling airflow over the radiator to cool the cooling medium. The main cooling pump and the air flow device are independently controllable. Such independent control of the coolant pump and the air flow over the radiator provides a great degree of coolant temperature control and, as a result, of the fuel cell temperature.

In accordance with a third embodiment of the system, the system includes at least one fuel cell stack for generating electrical power. The fuel cell stack is provided with at least one coolant inlet port and coolant outlet port. One or more pipes or conduits external to the fuel cell stack are provided and define a coolant path for carrying a cooling medium from the coolant outlet port to the coolant inlet port of the fuel cell stack. A temperature sensor is disposed to measure temperature of the cooling medium preferably proximate the outlet or inlet coolant port of the fuel cell stack and optionally a current sensor is disposed to measure electrical current flowing from the fuel cell stack. A control circuit is provided that includes at least one device that is disposed in the coolant path for increasing or decreasing heat transfer between the cooling medium and the fuel cell stack. The control circuit is responsive to the coolant temperature as measured by the temperature sensor and optionally to the current drawn from the fuel cell stack as measured by the current sensor to increase or decrease the heat transfer. In this manner, the system is provided with the inherent benefits of using the coolant temperature as a basis for controlling heat transfer while still being responsive to temperature changes caused by quickly fluctuating power demands placed on the fuel cell stack.

DETAILED DESCRIPTION OF PREFERRED EMBODIMENTS

Figure 1:
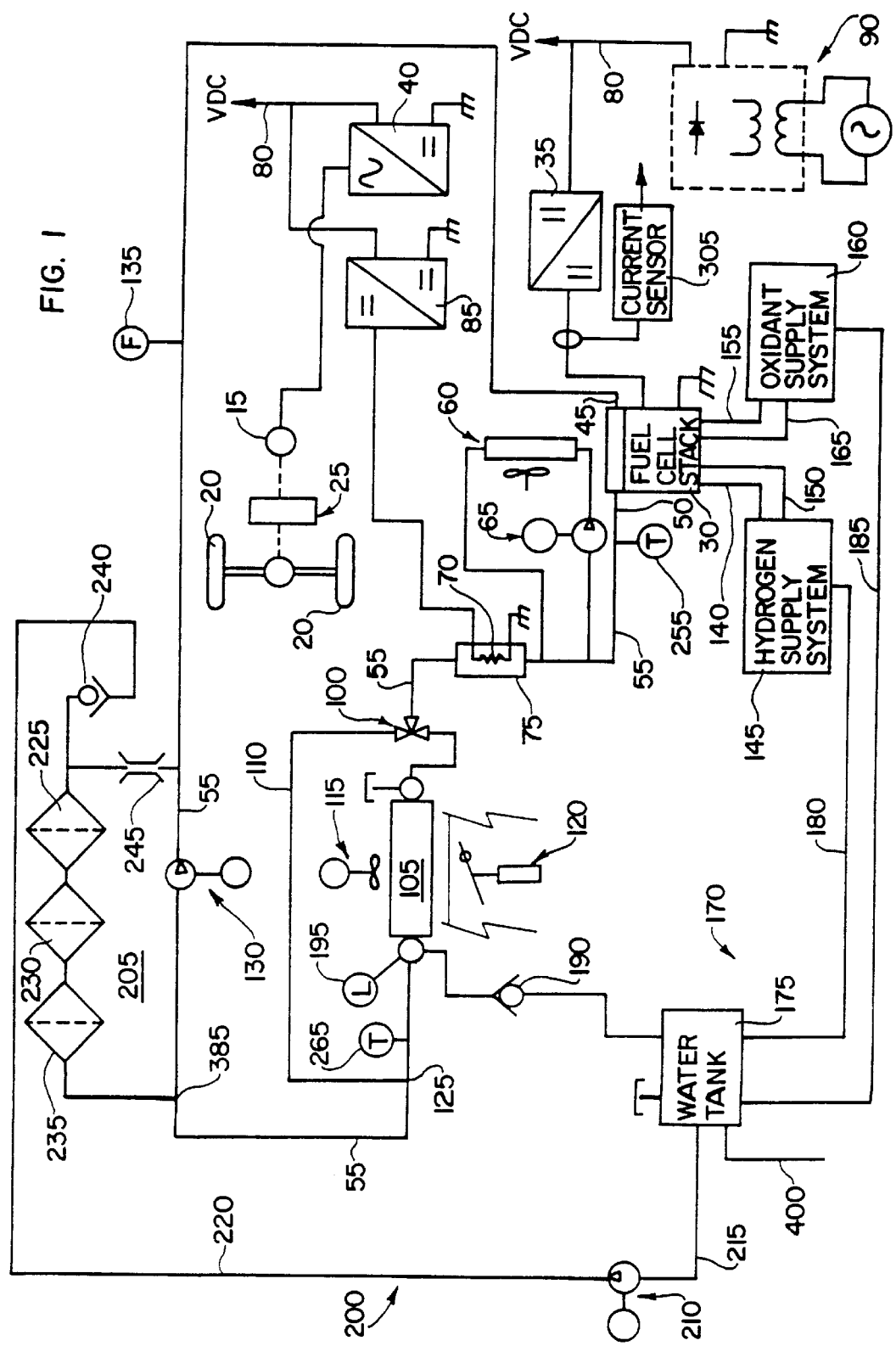
FIG. 1 is a schematic block diagram of an embodiment of a temperature regulating system in accordance with the teachings of the invention.

A temperature regulating system is shown generally at 10 in FIG. 1. In the illustrated embodiment, the temperature regulating system 10 is used in conjunction with a motor vehicle system that includes an electric drive motor 15 that is connected to drive, for example, the wheels 20 of the vehicle through a transmission 25. The electric motor 15 receives electrical power from a fuel cell stack 30 through, for example, a DC-DC booster 35 and a DC-AC inverter 40.

The fuel cell stack 30 may be one or more fuel cell stacks such as, for example, a solid polymer electrolyte fuel cell stack available from Ballard Power Systems Inc., of North Vancouver, B.C., Canada. The fuel cell stack 30 includes a coolant inlet port 45 and a coolant outlet port 50. A cooling medium, such as water, flows from the coolant inlet port 45, through the fuel cell stack 30, and exits the coolant outlet port 50 resulting in a heat exchange between the cooling medium and the fuel cell stack 30. Regulation of the temperature of the fuel cell stack 30 is dependent on the temperature of the cooling medium and the mass flow rate of the cooling medium through the fuel cell stack 30.

A plurality of cooling medium conduits or pipes 55 define a coolant path through which the cooling medium flows between the coolant outlet port 50 of the fuel cell stack 30 and the coolant inlet port 45. Upon exiting the coolant outlet port 50, the cooling medium encounters a coolant bypass system 60 which allows bypass, through pump 65, of some of the cooling medium from the coolant path to the cabin of the vehicle for heating of the vehicle cabin. The coolant bypass system 60 may be placed virtually anywhere within the coolant path.

The cooling medium next encounters a resistor 70 that is disposed in a sealed housing 75. The resistor 70 can dissipate regenerative power received from the electric motor 15 when the electric motor 15 is slowed or stopped. Regenerative power from the motor 15 is communicated through inverter 40 to a power bus 80 and therefrom to a DC-DC chopper 85 which, in turn, regulates the amount of power transferred to the resistor 70.

The resistor 70 is in thermal communication with the cooling medium. Placement of the resistor 70 in the coolant path in the illustrated manner thus has several advantageous aspects. First, the energy generated by the regenerative braking is dissipated within the temperature regulating system by the cooling medium flowing through the coolant path. Second, regenerative braking energy is converted into heat that is communicated to the cooling medium. Heating of the cooling medium may be desirable to maintain the fuel cell stack within a proper operating temperature range in cool ambient operating conditions. The resistor 70 may be connected to receive electricity from shore power from, for example, a shore power circuit 90, thereby allowing the resistor to function as an block heater that prevents the fuel cell stack 30 from freezing and facilitates start-up in cold weather. Fuel cell power from fuel cell stack 30 may also be used to supply electricity to the resistor 70. Fuel cell power may be advantageously used to power the resistor soon after start-up to bring the fuel cell stack 30 within the preferred operating temperature range and during operation to improve fuel cell performance by maintaining the fuel cell stack 30 within the preferred temperature range especially when the motor vehicle is operated in cool ambient temperatures. Fuel cell power may also be advantageously dissipated through the resistor 70 at shut down, the resistor thereby acting as a bleed resistor consuming reactants remaining in the fuel cell stack 30 and causing the stack voltage to fall so that the fuel cell stack is left in an electrically safe state. Other advantages also flow from the foregoing topology.

The cooling medium flowing from the resistor housing 75 next encounters a bypass valve 100 that controls coolant flow to a radiator 105 and a radiator bypass path 110. Bypass valve 100 can be a valve of the type that directs flow exclusively to either the radiator bypass path 110 or the radiator 105 or preferably can be of the type that can be controlled to divide the flow between the path 110 and radiator 105. Use of the bypass valve 100 in the illustrated topology facilitates more effective control of coolant temperature, particularly at low ambient temperatures. At such low ambient temperatures, if the medium is allowed to pass through the radiator 105, it may be undesirably cooled, thereby lowering the temperature of the fuel cell stack 30 below the most efficient operating temperature. Instead, the bypass valve 100 allows the cooling medium to bypass the radiator 105 thereby retaining its heat energy. Similarly, the bypass valve 100 may direct the cooling medium entirely through the radiator when the system is operating at higher ambient temperatures. If a variable position valve is used, the bypass valve 100 may be adjusted in a variable manner to direct the desired flow proportions between the radiator bypass path 110 and the radiator 105.

Coolant passing through the radiator 105 is cooled by air flow over the radiator 105. Control of the air flow can be obtained, for example, through use of a variable speed fan 115 and/or a variable position damper 120 that are disposed proximate the radiator 105. When the temperature of the cooling medium is to be increased, the fan 115 may be set to a low speed or off setting and, for example, the damper 120 may be set to a closed position. Such settings minimize the air flow over the radiator 105 and reduce any cooling effect provided when the cooling medium is passed through the radiator. When the temperature of the cooling medium is to be reduced, the fan 115 may be set to a high speed setting and the damper 120 may be set to a fully open state. Such settings increase the air flow over the radiator 105 to provide cooling of the cooling medium passing through the radiator 105.

Coolant exiting from either the radiator 105 or the bypass path 110 joins the principal coolant path at junction 125. The cooling medium is pumped through the coolant path by a main coolant pump 130. The flow rate of the cooling medium is sensed by a flow sensor 135. After passing through the main coolant pump 130, the cooling medium arrives full circuit at the coolant inlet port 45 of the fuel cell stack 30.

The main coolant pump 130 may be a variable speed pump. Control of the speed of the main coolant pump 130 facilitates control of the temperature of the cooling medium and, as a result, of the temperature of the fuel cell stack 30. In a preferred embodiment of the illustrated system, the fuel cell stack 30 generates electrical power from the electrochemical reaction of hydrogen and oxygen. Hydrogen is supplied to the fuel cell stack 30 through one or more gas conduits 140 from a hydrogen supply system 145. Residual hydrogen is returned to the hydrogen supply system 145 through one or more gas conduits 150. An oxygen-containing stream is supplied to the fuel cell stack 30 through one or more gas conduits 155 from an oxidant supply system 160. Residual oxidant is returned to the oxidant supply system 160 through one or more gas conduits 165. A pure oxygen supply is generally unnecessary. The oxidant supply system 160 could supply, for example, compressed air or oxygen-enriched air to the fuel cell stack 30. The hydrogen supply system 145 may, for example, supply essentially pure hydrogen or a hydrogen-containing stream such as a reformate stream. Other fuel cell reactions are likewise suitable for use with the illustrated temperature regulating system 10, the reactant supply systems utilized being dependent on the fuel cell reaction that is employed.

Water is the product of the hydrogen/oxygen reaction within the fuel cell stack 30. When the fuel cell reaction product is water, the cooling medium used in the temperature regulating system can include some of the product water. In this case the temperature regulating system may be advantageously integrated with a product water collection system, as shown in the illustrated embodiment 10. Alternatively, the cooling medium may be circulated in a separate closed loop and may be water, glycol or any suitable heat transfer fluid. Water is the cooling medium in the illustrated embodiment of the system.

In the illustrated embodiment, systems are employed to make use of the availability of the product water. A water storage system 170 is used to store product water produced by the fuel cell system. Central to the water storage system 170 is a water tank 175. The water tank 175 is connected through conduits 180 and 185 to receive product water collected from the hydrogen supply system 145 and/or oxidant supply system 160 respectively. A suitable trap which may be used to collect product water in the reactant supply systems, includes an Air Liquid Drainer, Model #1-LDC available from Armstrong Machine Works, Three Rivers, Mich. The water tank 175 is also connected to receive overflow water from the radiator 105 through a check-valve 190. The water tank 175 may also be pre-charged with water from an external source.

Water is supplied to the coolant path when required through a water pump system 200 and a water filter system 205. The water pump system 200 includes a water pump 210. The water pump 210 includes an inlet that is interconnected by a conduit 215 with the product water tank 175. When the water level in the radiator 105 drops below a predetermined level as sensed by a level sensor 195, the water pump 210 is operated to pump water from the water tank 175 to the principal coolant path. An outlet of the water pump 210 is connected through conduit 220 to the inlet of the water filter system 205. The water pump 210 controls flow of water from the water tank 175 to the water filter system 205.

The water filter system 205 filters water from the water tank 175 for use as the cooling medium. It may also be used to filter water from the coolant path 55. The filter system 205 may include a particulate filter 225, a carbon filter 230, and a deionizing filter 235 that are connected in series. A check-valve 240 prevents back-flow of coolant from the principal coolant path to the water tank, and directs water from the water tank 175 to the filters 225, 230, and 235. A sized orifice 245 controls the flow of water from the coolant path 55 to the filters. For example, the orifice may be sized so that approximately ten percent of the water flowing through the coolant path is diverted for filtration by the filter system 205.

Figure 2:
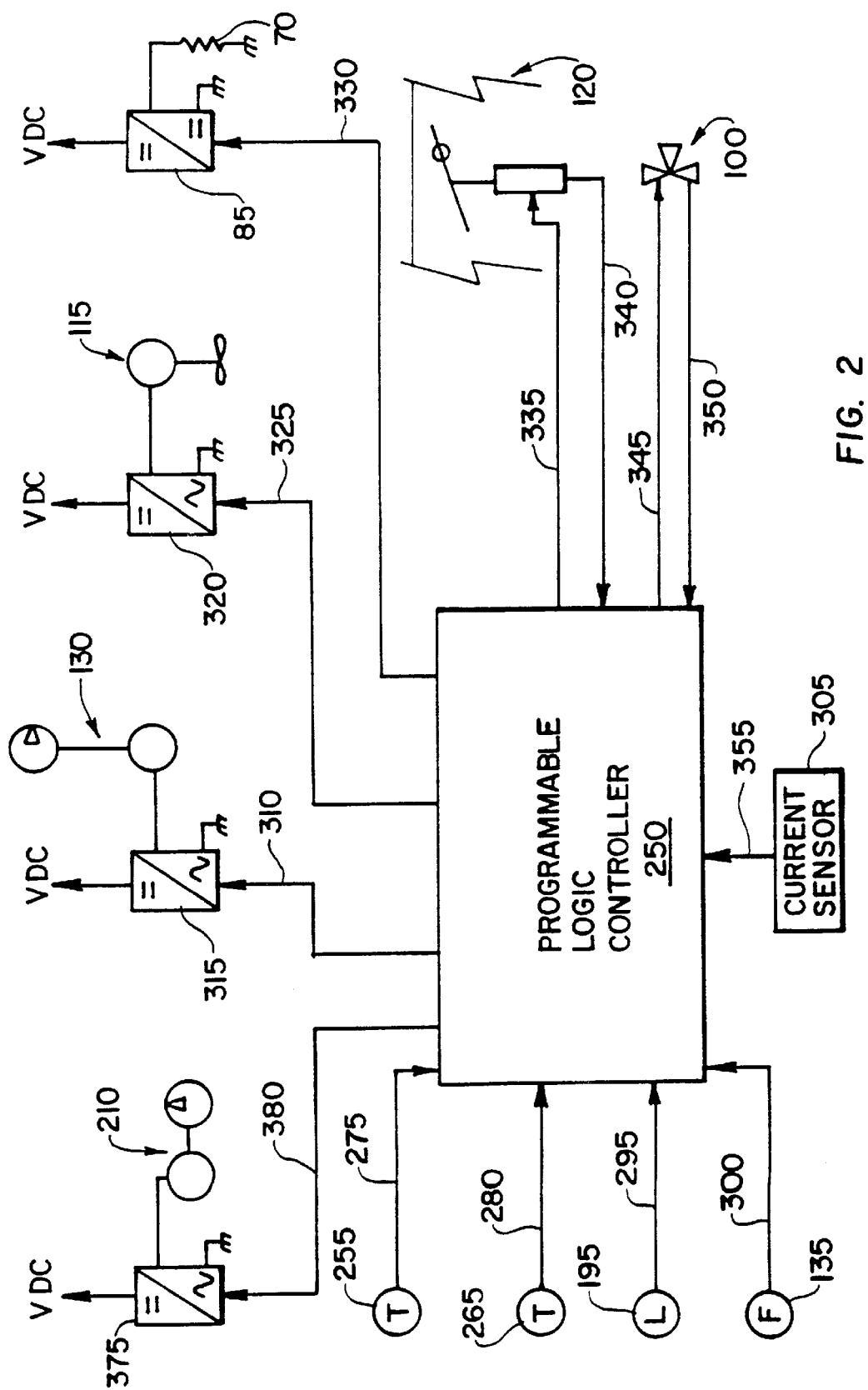
FIG. 2 is a schematic block diagram of a control circuit used to control heat transfer to and from the coolant in the system of FIG. 1.

The temperature regulating system of the foregoing topology can be controlled in a variety of ways. One control circuit is illustrated in FIG. 2. In the illustrated embodiment, a programmable logic controller ("PLC") 250 or other processing unit is used to sense a variety of input signals which, in turn, are used to provide output signals that actuate various system components in a manner which drives the temperature of the fuel cell stack 30 towards its optimum operating temperature range and, further, maintains the fuel cell stack 30 within this temperature range once it has been reached.

Temperature sensors 255 and 265 are disposed to sense the temperature of the cooling medium at various locations along the coolant path. Temperature sensor 255 is disposed to measure cooling medium temperature proximate the coolant outlet port 50 of the fuel cell stack 30 and transmits a signal indicative of the sensed temperature along one or more lines 275 to the PLC 250. It will also be realized that temperature sensor 255 may likewise be disposed to measure cooling medium temperature at the coolant inlet port 45. Temperature sensor 265 is disposed to measure coolant temperature of cooling medium exiting the radiator 105 and transmits a signal indicative of the sensed temperature along one or more lines 280 to the PLC 250.

Other sensors are also utilized in the temperature regulating system 10. Level sensor 195 is disposed to monitor the cooling medium level in the radiator 105 and transmits a signal indicative of the sensed level along one or more lines 295 to the PLC 250. Flow sensor 135 is disposed to measure cooling medium flow entering the fuel cell stack 30 at the coolant inlet port 45 and transmits a signal indicative of the sensed flow rate along one or more lines 300 to the PLC 250. A current sensor 305 is disposed to sense electric current flow from the fuel cell stack 30.

The PLC 250 uses one or more of the sensed signal inputs to control various devices that can either increase or decrease the temperature of the cooling medium flowing to the fuel cell stack 30. The PLC 250 may send a signal along one or more lines 310 to an inverter 315 to control the speed of the main cooling pump 130. Another inverter 320 receives a control signal along one or more lines 325 from the PLC 250 to control the speed of the radiator fan 115. Chopper circuit 85 receives a control signal from the PLC 250 along one or more lines 330 to control the amount of regenerative braking energy dissipated by the resistor 70 which may be used to heat the cooling medium, and, as previously noted, may also receive power from the shore power circuit 90 or from power supplied by the fuel cell stack 30. Damper 120 receives a control signal along one or more lines 335 to control the opening and closing of the damper 120 which, in turn, may transmit a signal along one or more lines 340 to the PLC 250 that indicates the position of the damper 120. The PLC 250 also provides a control signal along one or more lines 345 to the radiator bypass valve 100 to variably divide the flow of cooling medium between the radiator 105 and radiator bypass path 110. The radiator bypass valve 100 may provide a signal to the PLC 250 indicative of the position of the bypass valve 100 along one or more lines 350.

In operation, temperature sensor 255 provides the primary indicator of operating temperature of the fuel cell stack 30. The temperature sensed by temperature sensor 255 is used by the programmable logic controller 250 to determine the amount of heating or cooling of the cooling medium that is required to maintain the temperature of the fuel cell stack in its optimum operating range. Although placement of the temperature sensor 255 in the cooling system provides an indication of the fuel cell stack operating temperature, it will not respond to localized temperature changes within the fuel cell stack 30 caused by quickly fluctuating power demands on the fuel cell stack. Accordingly, current sensor 305 is used to measure electric current flow from fuel cell stack 30 and sends a signal indicative of the measured current along one or more lines 355. By monitoring current flow from the fuel cell stack 30, it becomes possible to quickly detect power fluctuations before the fluctuation results in a significant change in operating temperature of the fuel cell stack 30. Upon detection of a power fluctuation, the programmable logic controller 250 may implement steps to cool the cooling medium or raise the temperature thereof to compensate for the projected increase or decrease in the operating temperature of the fuel cell stack 30.

When the PLC 250 detects an increase in the fuel cell stack temperature above its optimal range by, for example, detecting an increase in the temperature sensed by temperature sensor 255, the PLC 250 may decrease the temperature of the cooling medium by taking one or more of the following actions: (1) increasing the flow of air over the radiator 105 by increasing the speed of the fan 115, (2) increasing the flow of air over the radiator 105 by opening air damper 120, (3) increasing the speed of the main cooling pump 130, and (4) adjusting bypass valve 100 to direct more coolant flow through the radiator 105. Similarly, when the PLC 250 detects a decrease in fuel cell stack temperature below its optimal range, the PLC 250 may increase the temperature of the cooling medium by taking one or more of the following actions: (1) decreasing the air flow over the radiator 105 by decreasing the speed of fan 115 or shutting it off, (2) reducing the flow of air over the radiator 105 by closing damper 120, (3) decreasing the speed of the main cooling pump 130, (4) controlling chopper 85 to increase the amount of power dissipated by brake resistor 70, and (5) adjusting bypass valve 100 to direct more coolant flow through the radiator bypass path 110.

Temperature sensors 255 and 265 and flow sensor 135 may be used to provide feedback to the PLC 250 indicative of certain actions taken by the PLC 250. For example, temperature sensor 265 provides feedback on the effect of changes to the speed of fan 115 and the opening or closing of damper 120 on the temperature of the cooling medium. Temperature sensor 255 provides feedback, among other things, on the effect of the state of bypass valve 100 on the temperature of the cooling medium. Flow meter 135 provides feedback relating to changes in the speed of the main cooling pump 130.

The cooling medium level within the coolant path may also be controlled by the PLC 250. To this effect, level sensor 195 is connected to provide a signal to the PLC 250 that is indicative of the level of the cooling medium level in, for example, the radiator 105. If the sensed level proceeds below a predetermined value, the PLC 250 may actuate water pump 210 through an inverter 375 along one or more lines 380 to direct water from the water tank 175 to the filter system 205. The filter system 205 filters the water from the water tank and supplies that water to the principal coolant path at junction 385. If the level proceeds above the level of a port connected to check-valve 190, cooling medium will flow to the water tank 175 for storage. In the event that the cooling medium level in the water tank 175 exceeds the overflow level it will exit the system via overflow conduit 400.

Figure 3:
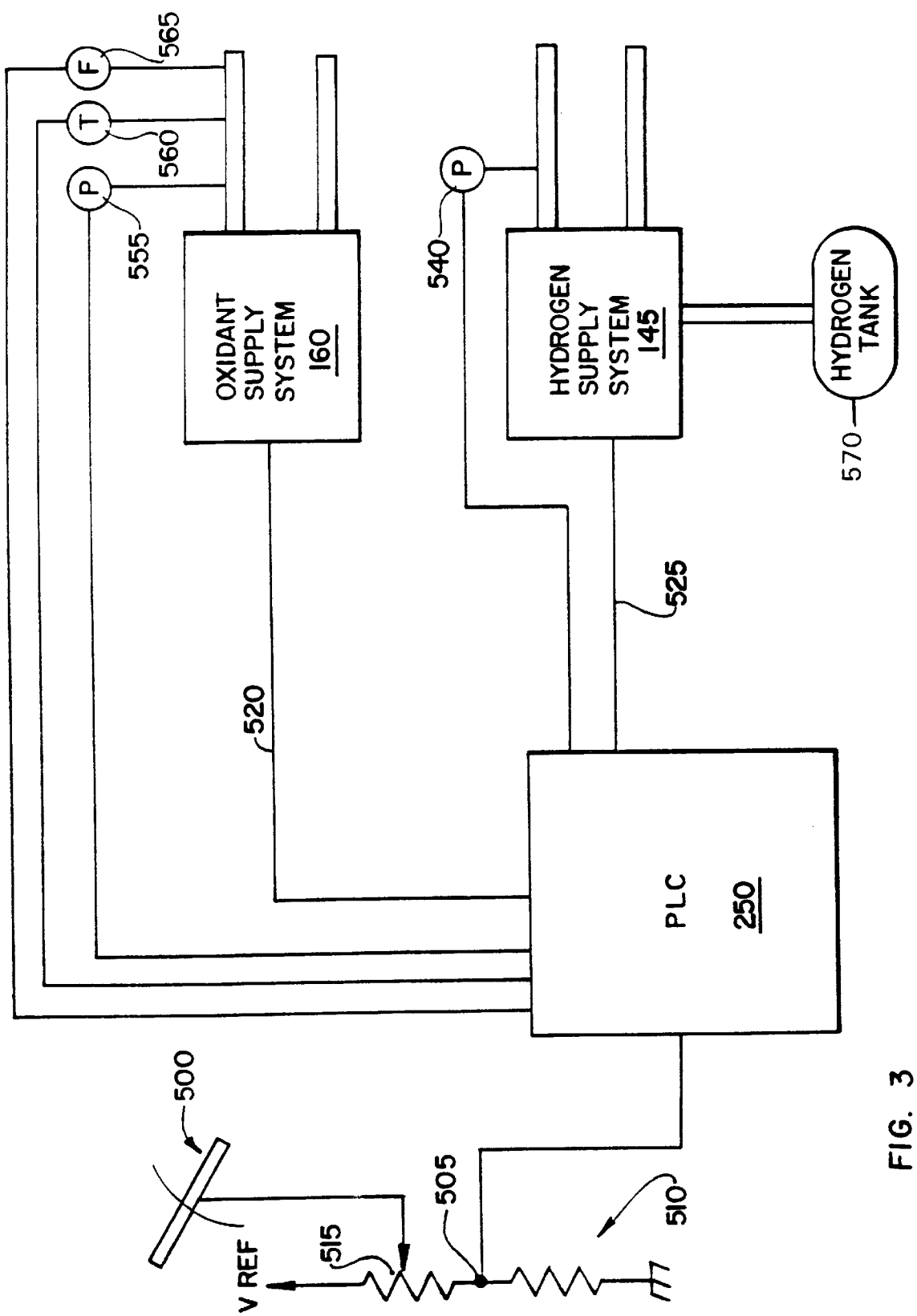
FIG. 3 is a schematic block diagram of one embodiment of a hydrogen and oxidant or air supply system that is suitable for use in the system of FIG. 1.

The hydrogen supply system 145 and oxidant supply system 160 may each be implemented in a variety of manners. One embodiment suitable for use in the system of FIG. 1 is illustrated in FIG. 3. Other embodiments of these systems are likewise suitable for use without departing from the scope of the present invention.

As illustrated in FIG. 3, the hydrogen supply system 145 and oxidant (in the illustrated embodiment the oxidant is air) supply system 160 are under the control of PLC 250. The PLC 250 detects the position of accelerator pedal 500 through, for example, monitoring the voltage at node 505 of voltage divider circuit 510. Voltage divider circuit 510 is linked to the accelerator pedal 500 so that the resistance of resistor 515 varies with the position of the pedal 500 thereby producing a corresponding voltage level at node 505.

The PLC 250 responds to the voltage level sensed at anode 505 and produces control output signals along lines 520 and 525 to the air supply system 160 and hydrogen supply system 145, respectively. These signals are used to control, for example, pumps within the supply systems 145 and 160 to regulate the flow of reactants to the fuel cell stack 30, thereby allowing the fuel cell stack to respond to the power demands of the vehicle. The PLC 250 also responds to the voltage level at node 505 to, control inverter 40 to facilitate control of electric motor 15. Feedback to the PLC 250 of the pressure of the hydrogen and pressure, temperature, and flow rate of the air is provided by sensors 540, 555, 560 and 565. In the embodiment illustrated in FIG. 3, hydrogen is provided to the hydrogen supply system through a refillable hydrogen tank 570.

Figure 4:
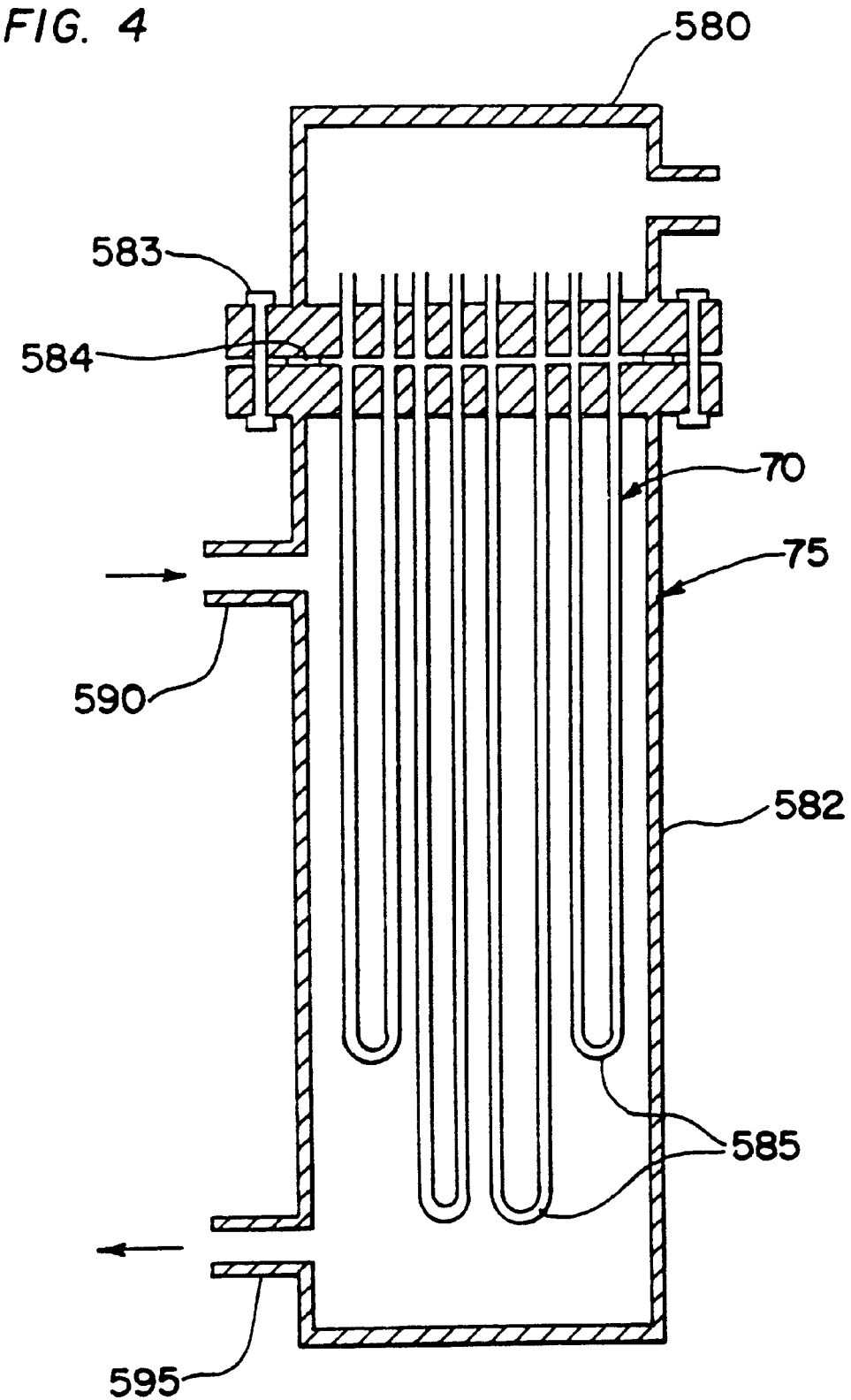
FIG. 4 is a side sectional view of one embodiment of a brake resistor and corresponding housing suitable for use in the system of FIG. 1.

FIG. 4 illustrates one embodiment of a resistor 70 and associated housing 75 suitable for use in the system of FIG. 1. As illustrated, the resistor 70 includes a cap portion 580 that is connected to a body portion 582 by fasteners 583. A gasket 584 is disposed between body portion 582 and cap 580. The cap portion 580 accepts the electrical connections from the DC to DC converter 85 that direct electric current therefrom to resistor elements 585. Resistor elements 585 are disposed within housing 75 and are placed in contact with coolant entering the housing 75 at inlet 590 and exiting the housing at outlet 595. The cap portion 580 and resistor elements 585 may be, for example, an immersion heater available from Ogden Manufacturing Company, of Arlington Heights, Ill.

By way of example, the following components may be used in the disclosed system:

| | |
|---|---|
| Temperature Probes (255, 560) | 100 Ohm Platinum, Part No. REB5310T available from Novatec Process Systems, Inc., of Langley, British Columbia |
| Main Cooling Pump (130) | Fybroc 1530 available from Plad Equipment Coquitlam, British Columbia |
| Motors | U.S. Electric Motors, Model B071A (3.0 HP) |
| Level Sensors | Omega LV 90 |
| Valve (100) | 3-Way ball valve available from PBM, Inc. of Irwin, PA |
| Actuator (120) | Model TA400-10 available from True-Torq, Inc. of Blanchester, OH |

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A temperature regulating system for an electric motor vehicle, the system comprising:
   (a) an electric motor for propelling the vehicle;
   (b) a fuel cell stack for supplying electrical power to the electric motor, the fuel cell stack having at least one coolant inlet port and at least one coolant outlet port;
   (c) at least one conduit external to the fuel cell stack defining a coolant path for carrying a cooling medium from the at least one coolant outlet port to the at least one coolant inlet port of the fuel cell stack;
   (d) a resistor in thermal communication with the cooling medium for heating the cooling medium, the resistor connected to at least one source of electrical power, wherein the at least one source of electrical power comprises regenerative electrical power derived from braking of the vehicle such that the regenerative electrical power thermally regulates the fuel cell stack.

2. The temperature regulating system of claim 1 further comprising a resistor housing having a coolant inlet and a coolant outlet, the resistor being disposed in the resistor housing.

3. The temperature regulating system of claim 1 wherein the system further comprises means for supplying a controlled amount of regenerative electrical power to the resistor.

4. The temperature regulating system of claim 1 wherein the at least one source of electrical power further comprises shore electrical power.

5. The temperature regulating system of claim 1 wherein the at least one source of electrical power further comprises electrical power generated by the fuel cell stack.

6. The temperature regulating system of claim 1 wherein the at least one source of electrical power further comprises shore electrical power, and electrical power generated by the fuel cell stack.

7. The temperature regulating system of claim 1 further comprising a cooling pump disposed in the coolant path.

8. The temperature regulating system of claim 7 further comprising a radiator disposed in the coolant path.

9. The temperature regulating system of claim 7 further comprising a radiator disposed in the coolant path, the resistor being disposed in the coolant path between the coolant outlet port of the fuel cell stack and the radiator.

10. The temperature regulating system of claim 8 further comprising:
    (e) at least one conduit defining a radiator bypass path for the coolant medium;
    (f) a bypass valve disposed in the coolant path to control flow of the cooling medium to the radiator and the radiator bypass path.

11. The temperature regulating system of claim 8 further comprising air flow means for providing a cooling airflow over the radiator to cool the cooling medium.

12. The temperature regulating system of claim 11 wherein the air flow means comprises:
    (a) a fan disposed proximate the radiator to generate an air flow over the radiator; and
    (b) speed control means for varying the speed of the fan.

13. The temperature regulating system of claim 11 wherein the air flow means comprises:
    (a) a damper disposed proximate the radiator to regulate air flow over the radiator; and
    (b) position control means for controlling positioning of the damper.

14. The temperature regulating system of claim 8 wherein the cooling pump is disposed in the coolant path between the radiator and the coolant inlet port of the fuel cell stack.

15. The temperature regulating system of claim 1 further comprising:
    (e) a hydrogen supply system connected to the fuel cell stack;
    (f) an air supply system connected to the fuel cell stack, the hydrogen and air supply systems providing reactants for fuel cell reactions to generate the electric power to the electric motor, the fuel cell reactions resulting in product water in at least one of the hydrogen and air supply systems.

16. The temperature regulating system of claim 15 wherein the cooling medium comprises product water collected from at least one of the hydrogen and air supply systems.

17. The temperature regulating system of claim 8 further comprising:
    (e) a hydrogen supply system connected to the fuel cell stack;
    (f) an air supply system connected to the fuel cell stack, the hydrogen and air supply systems providing reactants for fuel cell reactions to generate the electric power to the electric motor, the fuel cell reactions resulting in product water in the hydrogen and air supply systems.

18. The temperature regulating system of claim 17 further comprising a product water collection system for collecting at least a portion of the product water from at least one of the hydrogen and air supply systems.

19. The temperature regulating system of claim 18 wherein the water collection system comprises:
   (a) a water tank connected to receive product water from the hydrogen and air supply systems;
   (b) a water pump for pumping water from the water tank into the coolant path.

20. The temperature regulating system of claim 18 wherein the product water collection system comprises:
   (a) a water tank connected to receive product water from the hydrogen and air supply systems;
   (b) a water filtering system for filtering water from the water tank;
   (c) water pump for pumping filtered water from the water tank into the coolant path.

21. The temperature regulating system of claim 7 further comprising a temperature sensor positioned to detect coolant temperature proximate to the fuel cell stack.

22. The temperature regulating system of claim 21 further comprising a current sensor disposed to measure electrical current flowing from the fuel cell stack.

23. The temperature regulating system of claim 22 further comprising a radiator disposed in the coolant path.

24. The temperature regulating system of claim 23 further comprising air flow means for providing a cooling airflow over the radiator to cool the cooling medium.

25. The temperature regulating system of claim 24 wherein the air flow means comprises:
   (a) an electric fan disposed proximate the radiator to generate an air flow over the radiator; and
   (b) speed control means for varying the speed of the electric fan.

26. The temperature regulating system of claim 24 wherein the air flow means comprises:
   (a) a damper disposed proximate the radiator to regulate air flow over the radiator; and
   (b) position control means for controlling positioning of the damper.

27. The temperature regulating system of claim 22 further comprising control means including at least one device disposed in the coolant path for increasing or decreasing heat transfer between the cooling medium and the fuel cell stack, the control means being responsive to at least one of the temperature sensor and the current sensor for increasing or decreasing the heat transfer.

28. The temperature regulating system of claim 27 wherein the at least one device comprises speed control means for varying the speed of the cooling pump disposed in the coolant path.

29. The temperature regulating system of claim 27 wherein the at least one device comprises:
   (a) a radiator disposed in the coolant path; and
   (b) air flow means for providing a cooling airflow over the radiator to cool the cooling medium.

30. The temperature regulating system of claim 29 wherein the air flow means comprises:
   (a) an electric fan disposed proximate the radiator to generate an air flow over the radiator; and
   (b) speed control means for varying the speed of the electric fan.

31. The temperature regulating system of claim 29 wherein the air flow means further comprises:
   (a) a damper disposed proximate the radiator to regulate air flow over the radiator; and
   (b) position control means for controlling positioning of the damper.

32. The temperature regulating system of claim 27 wherein the at least one device comprises:
   (a) a radiator disposed in the coolant path; and
   (b) at least one conduit defining a radiator bypass path for the coolant medium;
   (c) a bypass valve disposed in the coolant path to control flow of the cooling medium from the coolant outlet port to the fuel cell stack to the radiator and the radiator bypass path.

33. The temperature regulating system of claim 1 wherein the fuel cell stack is a solid polymer fuel cell stack.

34. The temperature regulating system of claim 5 wherein the resistor receives electric power generated by the fuel cell stack immediately prior to cessation of fuel cell stack operation.

* * * * *